US006522754B1

(12) United States Patent
Long et al.

(10) Patent No.: US 6,522,754 B1
(45) Date of Patent: Feb. 18, 2003

(54) DIGITAL VEHICLE MICROPHONE SYSTEM AND METHOD

(75) Inventors: William E. Long, Seacliff, NY (US); Alan Chen, Flushing, NY (US); Rich Gibbons, Valley Stream, NY (US)

(73) Assignee: Clever Devices, Ltd., Syosset, NY (US)

( * ) Notice: Subject to any disclaimer, the term of this patent is extended or adjusted under 35 U.S.C. 154(b) by 0 days.

(21) Appl. No.: 09/132,604

(22) Filed: Aug. 11, 1998

Related U.S. Application Data

(60) Provisional application No. 60/055,589, filed on Aug. 12, 1997.

(51) Int. Cl.[7] .......................... H04R 27/00; H04B 1/00
(52) U.S. Cl. .......................................... 381/82; 381/86
(58) Field of Search ............................ 381/82, 91, 86, 381/111, 92

(56) References Cited

U.S. PATENT DOCUMENTS 5,193,141 A * 3/1993 Zwern ........................ 381/86
5,459,702 A * 10/1995 Greenspan .................. 369/25
5,467,071 A * 11/1995 Koenig ...................... 340/433

* cited by examiner

*Primary Examiner*—Forester W. Isen
*Assistant Examiner*—Elizabeth McChesney
(74) *Attorney, Agent, or Firm*—Dilworth & Barrese, LLP

(57) ABSTRACT

According to the present disclosure, a digital vehicle microphone system for recording and playback of announcements pertaining to vehicle stops and route information is provided for use over public address systems installed on public transportation vehicles. The system includes a microphone apparatus for digitally pre-recording the announcements. The microphone apparatus includes a microphone, a mute switch, a radio mode switch, a record switch and a record indicator. The system also includes a control circuit for recording and storing at least two separate announcements onto memory storage devices. The control circuit further includes a delayed playback feature for delayed playback of the announcements through the vehicle's public address system. The microphone apparatus further includes a "hands free" microphone including hand and foot actuated recording switches. The hand actuated record switch is used to record the vehicle's route information and the foot actuated record switch is used to record the vehicle's upcoming stop announcements. A method of operating a vehicle public address system is also disclosed.

3 Claims, 3 Drawing Sheets

DIGITAL VEHICLE MICROPHONE SYSTEM AND METHOD

CROSS-REFERENCE TO RELATED APPLICATIONS

This Patent Application claims the benefit of U.S. Provisional Application No. 60/055,589 filed Aug. 12, 1997.

BACKGROUND

1. Technical Field

The present disclosure relates to a digital vehicle microphone system for recording and announcing messages over public address systems in public transportation vehicles. More particularly, this disclosure is directed at a system that enables operators of vehicles used in public transportation to make announcements to passengers pertaining to scheduled stops and route information without interfering with the operator's ability to safely drive the vehicle.

2. Background of Related Art

Current modes of public transportation require the operator of the vehicle to make announcements to passengers pertaining to specific vehicle routes and upcoming stops. This is particularly seen in the use of bus and other similar public transportation vehicles. Until now, announcements made by an operator of a bus required the operator to reach over to a flexibly mounted-type microphone and pull it close to his or her mouth while simultaneously depressing a "push-to-talk" switch. This procedure had to be repeated over and again at each stop making it difficult for the operator to fully concentrate on driving the vehicle. Alternatively, some public transportation vehicles use a microphone-type system, these systems are not well suited to an environment which includes factors such as ambient and traffic noise, feedback and the like. Consequently, there is a need for a microphone system for use on public transportation vehicles which would enable the operator to make "hands free" announcements regarding upcoming stops while eliminating audio feedback and also eliminating the need for the operator to make repeated route information announcements upon arriving at each stop.

Therefore, it would be highly desirable to have a "hands free" announcement system which would enable a operator of a vehicle to make announcements pertaining to the vehicle's upcoming stops and route information.

Accordingly, it is one object of the present disclosure to provide a digital vehicle microphone system which provides "hands free" announcements of upcoming vehicle stops while eliminating the need for the operator to physically hold the microphone and pull it close to his/her mouth while trying to safely operate the vehicle.

It is a further object of the present disclosure to provide a digital vehicle microphone system which automatically announces the vehicle's particular route information through an external speaker broadcast system upon the activation of the vehicle's exterior door.

It is a further object of the present disclosure to provide a digital vehicle microphone system which employs a microphone sensitive enough to pick up the operator's voice from a distance where the operator remains in full control of the vehicle.

It is a further object of the present disclosure to provide a digital vehicle microphone system which eliminates feedback by pre-recording the operator's announcements and then replaying the announcements only after the operator has finished the recording process.

It is also an object of the present disclosure to provide a digital vehicle microphone system which provides "hands free" radio communication between the operator and the vehicle dispatch headquarters.

It is a further object of the present disclosure to provide a digital vehicle microphone system which is capable of being easily interfaced to existing public address systems already installed on public transportation vehicles.

It is also an object of the present disclosure to provide a digital vehicle microphone system which is compactly provided in a rugged tamper-proof casing.

These and other highly desirable and unusual results are accomplished by the present disclosure in a digital vehicle microphone system which enables "hands free" announcements of upcoming stops and route information.

Objects and advantages of the present disclosure are set forth in part herein and in part will be obvious therefrom, or may be learned by practice with the present disclosure, which is realized and attained by means of the instrumentalities and combinations pointed out in the appended claims. The present disclosure consists of novel parts, constructions, arrangements, combinations, steps and improvements herein shown and described.

SUMMARY

According to the present disclosure, a digital vehicle microphone system for recording and playback of announcements pertaining to upcoming vehicle stops and route information is provided for use over public address systems in public transportation vehicles.

The system includes a microphone apparatus used to record the announcements. The microphone apparatus includes a highly sensitive microphone, a record switch, a record indicator, a mute switch and indicator and radio control switch and indicator for radio control modes of operation.

The system also includes a control circuit for digitally recording and storing at least one announcement into memory storage devices such as digital memory chips. The control circuit includes a delayed playback feature for delayed playback of the announcements through the vehicle's public address system.

The microphone apparatus further includes a "hands free" microphone including hand and foot actuated recording switches. The hand actuated record switch is used to record the vehicle's route information and the foot actuated record switch is used to record the vehicle's upcoming stop information.

Also disclosed is a method of operating the vehicle public address system including recording the route information announcement prior to commencement of the vehicle's route. The recording includes actuation of a first record switch, wherein the route information announcement is automatically broadcast upon opening of the vehicle's passenger door. The method also includes pre-recording the vehicle's upcoming stop announcements prior to the vehicle's arrival at the vehicle stop. The pre-recording includes actuation of a second record switch, wherein the upcoming stop announcement is automatically broadcast upon conclusion of the pre-recording.

BRIEF DESCRIPTION OF THE DRAWINGS

The accompanying drawings, referred to herein and constituting a part hereof, illustrate the preferred embodiments of the apparatus of the present disclosure, and, together with the description serve to explain the principles of the present disclosure.

DETAILED DESCRIPTION OF PREFERRED EMBODIMENTS

Figure 3:
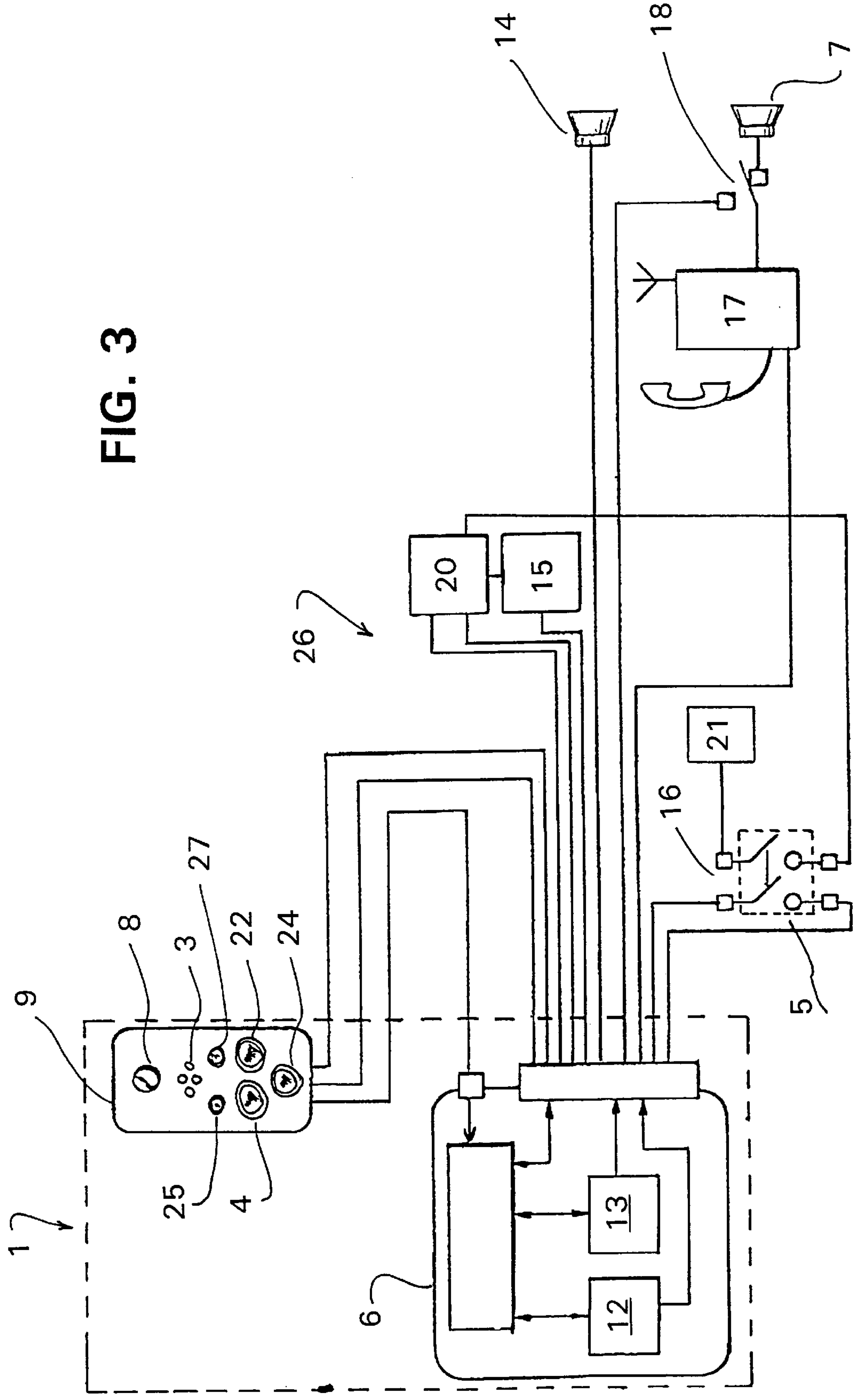
FIG. 3 is a schematic diagram view of the digital vehicle microphone system interfaced with the vehicle's pubic address system.

The digital vehicle microphone system 1 of the present disclosure easily interfaces to existing public address (PA) systems 26 currently installed on public transportation vehicles. The system 1 described herein includes a "hands free" microphone apparatus 2 having a highly sensitive condenser microphone 3, a push-to-record hand actuated record switch 4 and a dual color record mode light emitting diode (LED) 8. The microphone apparatus 2 also includes a mute switch 22 for disabling outside announcements made over the vehicles PA system 26 and a radio switch 24 for "hands free" communication between the operator and radio dispatch headquarters. The microphone apparatus 2 is electronically connected to a control circuit 6 which is capable of storing at least one pre-recorded announcement and then playback the announcement as needed by the operator of the vehicle or automatically when an external signal is triggered, i.e. opening the passenger door of the vehicle. In alternative embodiments, microphone apparatus 2 includes a mute switch indicator 25 and a radio mode indicator 27 (FIG. 3).

Figure 1:
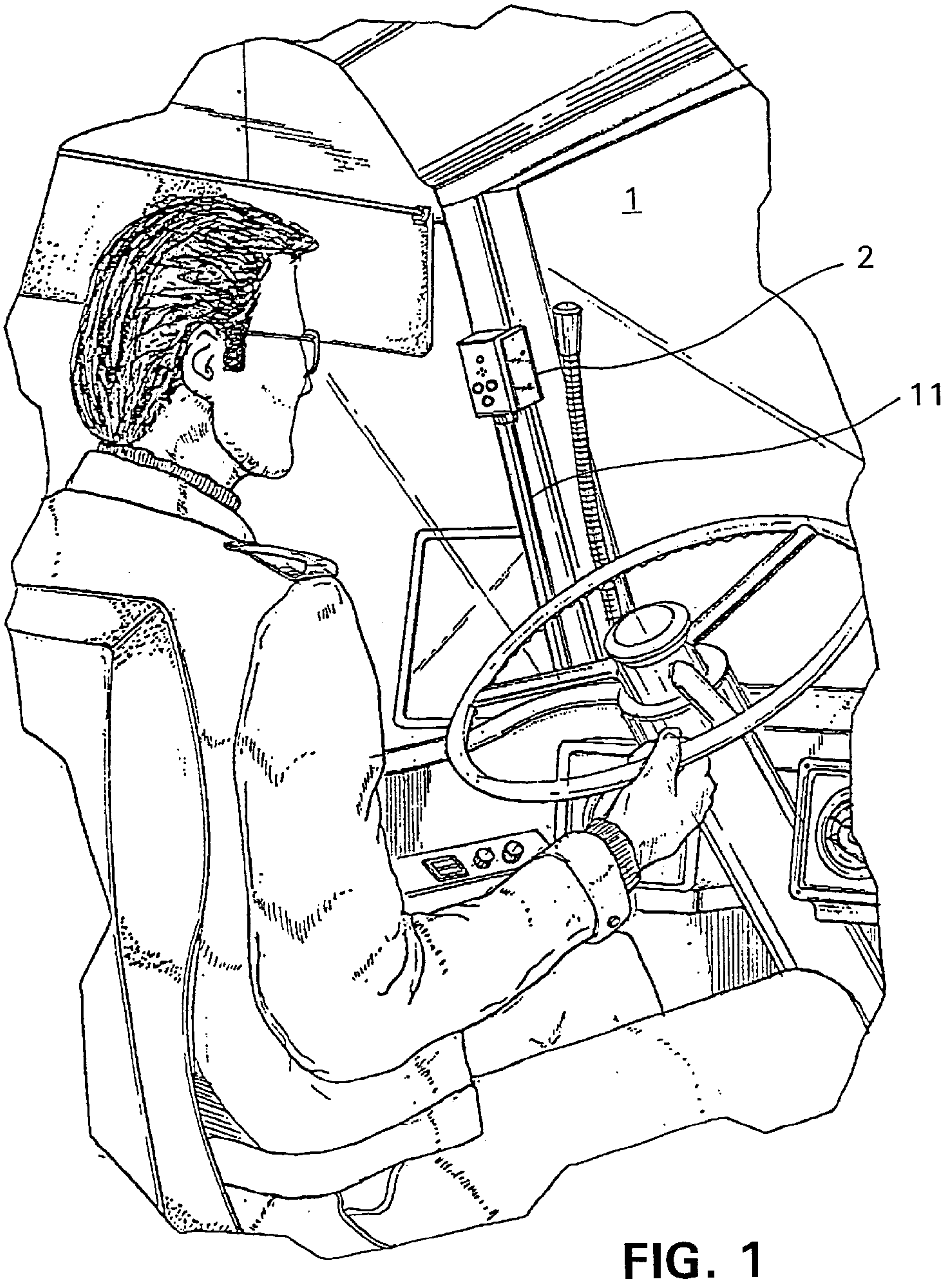
FIG. 1 is a perspective view of the digital vehicle microphone system mounted to a public transportation vehicle and interfaced to the vehicle's public address system.

FIG. 1 shows the digital vehicle microphone system 1 in its operational state and location where the microphone apparatus 2 is mounted to the structure of a public transportation vehicle such as a bus. It is to be understood that the applicability of the system 1 is not limited to only that of a bus type vehicle, but can also be implemented on similar vehicles such as trolleys, shuttle vans, water shuttles, and the like. The system 1 is designed to easily interface to existing public address systems 26 currently installed on public transportation systems.

Figure 2:
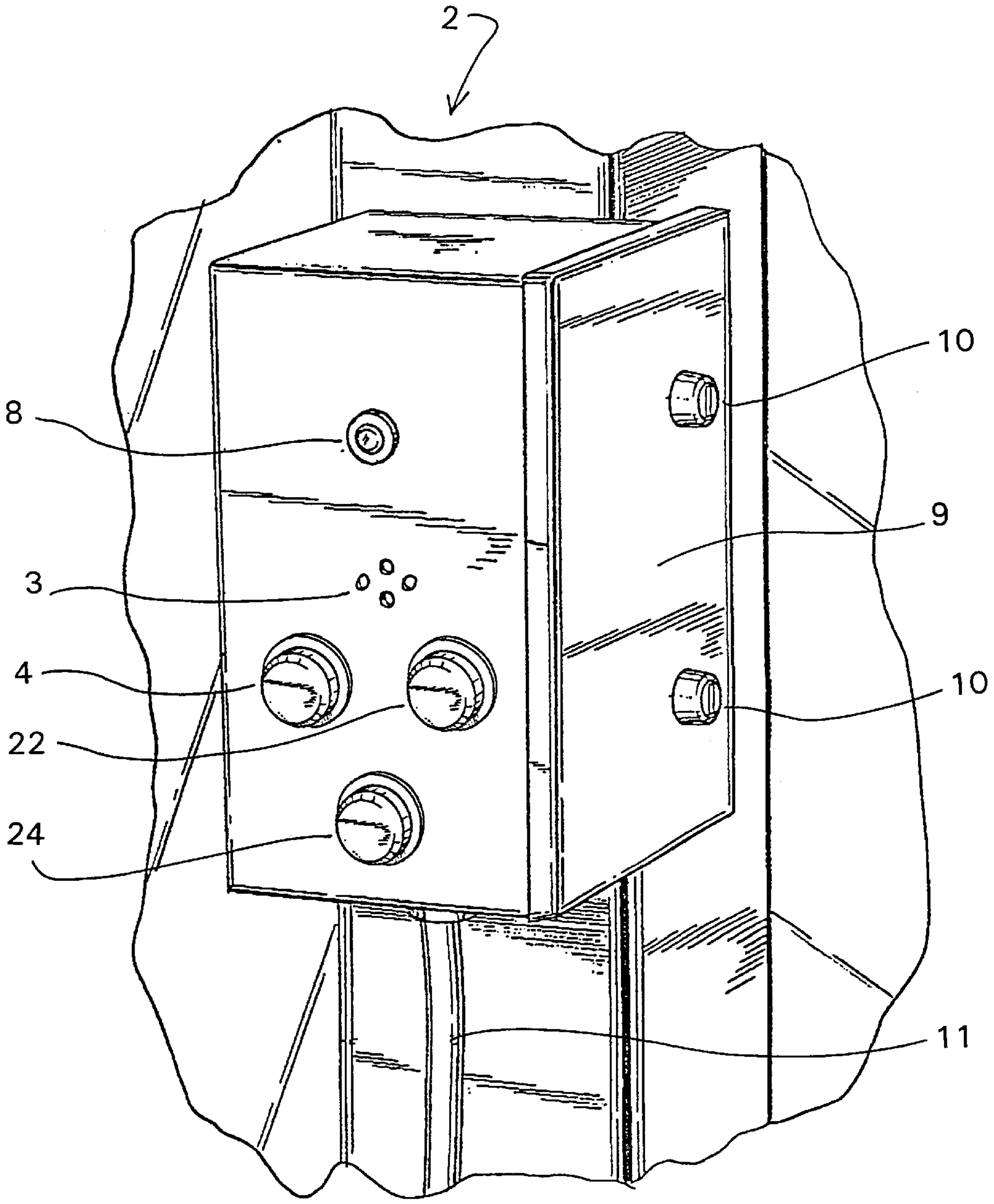
FIG. 2 is a plan view of the digital vehicle microphone system and casing.

As can be seen in FIG. 1, the microphone apparatus 2 is mounted at a location that is out of the operators's line of sight and preferably at a level approximately equal to the level of the operator's head. A preferable mounting location of the microphone apparatus 2 is along a window frame of the bus, as is best shown at FIGS. 1 and 2. The mounting location of the microphone apparatus 2 is such that it does not impede or obstruct the operator's ability to safely drive the bus and such that allows the operator to pre-record announcements using a normal tone level while remaining seated in the operator's normal operating position, i.e. seated comfortably in the drivers seat. The highly sensitive condenser microphone 3 is designed to be sensitive enough to pick up the operator's voice without the need for the operator to shout or lean in towards the microphone 3. This enables the operator to make "hands free" announcements pertaining to the bus route information, upcoming bus stops and radio communication with dispatch headquarters.

The PA systems 26 installed on many public transportation vehicles includes both internal and external speakers for the announcing of upcoming stops and route information, respectively. As is shown in FIG. 3, the digital vehicle microphone system 1 of the present disclosure is interfaced with a bus public address system 26 which includes an internal speaker broadcast system 7 and an external speaker broadcast system 14. The external speaker broadcast system 14 is electrically connected to the control circuit 6. The external speaker system 14 is used to playback the pre-recorded bus route information when triggered by a specific signal such as the opening of the bus passenger door. Similarly, the internal speaker broadcast system 7 is also electrically connected to the control circuit 6. The internal speaker system 7 is used to playback the upcoming bus stop announcement once the operator of the bus has completed pre-recording the particular announcement.

With particular reference to FIGS. 2 and 3, the system 1 is capable of pre-recording two separate announcements, the first, an externally broadcast bus route announcement and, the second, an internally broadcast upcoming bus stop announcement. The bus route information is recorded using a push-to-record hand actuated record switch 4 which is located on an external face of microphone apparatus 2. The recording of upcoming bus stops is accomplished through the use of a foot actuated record switch 5 located at the operator's feet. The foot actuated record switch 5 is electronically coupled to the control circuit 6 and is powered by the vehicle's 12 volt DC power source 20, i.e. battery, as is the entire system 1. The foot actuated record switch 5 is actuated by the operator's foot while he/she is driving thus leaving the operator's hands on the wheel and the operator in complete control of the vehicle at all times. Upon actuation of the foot actuated record switch 5, a signal is sent to the control circuit 6 to begin recording the upcoming stop information. Upon completion of the recording, the operator takes his/her foot off the foot actuated record switch 5 setting the record switch to its off position. The system 1 through control circuit 6 then automatically begins playback of the pre-recorded upcoming bus stop announcement over the bus internal speaker broadcast system 7.

According to FIG. 2, the microphone apparatus 2 consists primarily of a hand actuated record switch 4, a highly sensitive condenser microphone 3, a mute switch 22, a radio switch 24 and a dual color record indicator LED 8. In a preferred embodiment, the dual color record indicator LED 8 illuminates green upon recording of the internal message. Similarly, upon recording of the external message, the LED 8 illuminates red. The use of any other colors or color combinations with the system 1 of the present disclosure is obviously contemplated.

The mute switch 22 is used to disable the playback of the bus route announcement through the external speaker system 14, once the mute switch 22 is actuated, LED 8 will flash red at 15 second intervals to remind the operator that the external speaker system 14 is disabled. A subsequent actuation of mute switch 22 will enable the external speaker system 14 back to normal PA conditions.

Radio switch 24 enables an operator to make "hands free" communications with the radio dispatch center in much the same manner as recording the internal and external messages. Actuation of radio switch 24 disables the internal 7 and external 14 speaker broadcast systems of the bus PA system 26 thereby allowing the operator to communicate through the microphone 3 and radio 17 and associated radio speaker system (not shown) without delay.

The microphone elements and switches of microphone apparatus 2 are preferably housed within a rugged, vandal and tamper resistant casing 9 approximately nine inches in height and three inches in width, although other dimensions are obviously contemplated and are within the scope of the present disclosure. The casing 9 is easily mounted to the vehicle by any number of known tamper resistant fasteners such as a bolt 10, although the use of screws, rivets, bands and the like are also contemplated. The microphone elements and/or casing 9 may also be remotely mounted throughout the vehicle.

The casing 9 is coupled to a flexible metal harness assembly 11 and conduit (not shown) disposed therein. The conduit includes all the electrical leads associated with the features of the digital vehicle microphone system 1. Once harness assembly 11 is coupled to casing 9, the conduit is electrically attached to the control circuit 6 of the microphone apparatus 2 via a plug-in type connector. The control circuit 6 is ideally located within casing 9 but may also be located on the floor of the bus or at any other location that does not obstruct the operator's ability to safely operate the bus. The control circuit 6 of system 1 is physically manifested upon a printed circuit board (PCB), as is known in the art, and fixedly secured within casing 9.

Now referring to FIG. 3, the schematic diagram of the digital vehicle microphone system 1 as interfaced to a typical bus public address system 26 is shown. System 1 includes control circuit 6 (PCB) housed within outer casing 9 of microphone apparatus 2. Preferably, the control circuit 6 includes memory storage devices capable of storing the operator's announcements onto digital memory chips 12 and 13. The control circuit 6 also includes circuitry capable of delaying playback of each announcement until triggered by a specific signal. The digital memory chips 12, 13 are each capable of storing a separate announcement having a maximum recording time of 30 seconds. It is also contemplated that the memory storage devices according to the present disclosure may include analog, magnetic tape digital circuitry or other known information storage devices. The first announcement regarding the bus route information is stored in a first digital memory 12, while the second announcement regarding the upcoming bus stop is stored in a second digital memory 13. Alternately, the bus route and upcoming stop information can be stored in either digital memory chips 12, 13.

An important feature of the digital vehicle microphone system 1 is its ability to eliminate feedback of the operator's announcements over the bus internal 7 and external 14 speaker broadcast system. To remedy any feedback problems, the control circuit 6 is designed to initially pre-record the operator's announcements, store the pre-recorded announcements in the digital memories 12 and/or 13 and subsequently, play back the announcements once the recording process is complete or when triggered by an outside signal.

According to the present embodiment, the operator pre-records the upcoming bus stop announcement into the second digital memory 13. Once the operator has finished pre-recording the message and has turned off the foot actuated record switch 5, by operation of removing his/her foot off the record switch 5, the announcement is subsequently broadcast through the bus internal speaker broadcast system 7. The pre-recording and subsequent playback of the announcement eliminates the possibility of feedback and provides for the clear and audible broadcast of the announcement. Similarly, the bus route information announcement is also pre-recorded. This announcement is stored in the first digital memory 12 and then played back through an external speaker broadcast system 14 upon actuation of an outside signal such as opening of the bus passenger door.

A door trigger relay signal 15 is used to trigger the first digital memory 12 of system 1 to respond and playback the bus route announcement through external speaker system 14. The door trigger relay signal 15 is electrically connected to control circuit 6 and is tripped when the passenger door to the bus is opened. Once the door trigger relay signal 15 is tripped, the control circuit 6 automatically begins playback of the pre-recorded bus route information announcement over the bus external speaker broadcast system 14.

The fan-blower relay switch 16 and fan blower 21 are both electrically coupled to the foot actuated record switch 5 and the hand record switch 4. Record switches 4 and 5 are both electrically connected to the control circuit 6. Upon actuation of either the foot actuated record switch 5 or the hand actuated record switch 4, the fan-blower relay switch 16 disengages the bus fan-blower 21 thereby lowering the bus interior ambient noise level and enabling the operator to pre-record a clear announcement through the highly sensitive condenser microphone 3.

A two-way radio and handset 17, for example, a Motorola Spectra Radio Handset, is part of the bus PA system 26. As such, the radio 17 is also interfaced with the system 1 of the present disclosure. The radio 17 is electronically connected to the control circuit 6 and to a radio bypass switch 18. The radio 17 is interfaced into system 1 such that any incoming radio message has priority over an announcement concurrently being broadcast over the internal speaker broadcast system 7.

The system 1 includes a radio switch 24 in microphone apparatus 2 which enables the operator to make "hands free" communications with dispatch headquarters in much the same manner as recording the internal and external messages, that is, having both hands on the steering wheel and remaining in full control of the vehicle. Once radio switch 24 is actuated, both the internal and external speaker systems of the bus PA system 26 are disabled leaving all radio 17 communication relayed through the microphone 3 and the radio's 17 own speaker system. While in the radio mode, LED 8 will continuously flash in both red and green colors. Subsequent actuation of the radio switch 24 returns the system 1 back to normal PA mode.

The radio bypass switch 18 is electrically coupled to the two-way radio 17, the speaker broadcast system 7 and 14 and control circuit 6. The radio bypass switch 18 is used to automatically divert broadcast of any incoming radio message directly over to the internal speaker broadcast system 7, as well as, the radio 17 speaker system. The bypass switch 18 will also interrupt any announcement concurrently being broadcast by the control circuit 6, i.e. an upcoming bus stop announcement, in order to switch to the incoming radio message. This is done to insure that the operator of the vehicle immediately receives and is made immediately aware of any important information that is broadcast over the radio 17 from vehicle dispatch headquarters.

The present disclosure is specifically designed to be incorporated into a conventional PA system 26 of a public transportation vehicle such as a bus or other similar vehicle. The typical bus PA system 26 includes volume control switches for adjusting internal 7 and external 14 speaker system volume levels. Also included are internal/external switches electrically connected via an internal/external relay control signal (not shown) to the digital vehicle microphone system 1. The internal/external switches are primarily used for alternating the playback of internal and external recorded messages to the external and internal speaker systems, respectively. The internal/external relay control signal is a driver relay incorporated as part of the digital vehicle microphone system 1. This internal/external relay is used to communicate the actuation of the internal/external switches to the control circuit 6 to thereby instruct the control circuit 6 to playback the recorded messages. The digital vehicle microphone system 1 of the present disclosure also includes several optional driver relays and wiring harnesses that can be used for future optional functions relating to the PA system, driver controls and the like.

Operation of the System

The digital vehicle microphone system 1 is designed to enable vehicle operators, namely bus drivers, to make stop and route announcements without interfering with the operator's ability to drive safely. The "hands free" microphone apparatus 2 is so designed to effectively pick up and pre-record the operator's normal speaking voice thus eliminating the need for the operator to shout out the upcoming bus stops and/or bus route information.

In use, the operator of the bus, upon the beginning of his/her intended daily route and before actually driving the bus, would actuate the hand actuated record switch 4 and record the intended bus route that will be driven. During the recording of the bus route, the fan-blower relay switch 16 will disengage the fan-blower 21 and the record mode indicator LED 8 will illuminate red to notify the operator that the system 1 is now recording the message. With the present disclosure, the operator need not shout out the announcement since the highly sensitive condenser microphone 3 will clearly pick up the operator's voice. The route information message is then digitally stored in the first digital memory 12. Once recorded, the message will remain in the first digital memory 12 until another message is recorded over it. The route information announcement will then be automatically broadcast through the external speaker broadcast system 14 whenever the passenger door is opened.

Once traveling along the scheduled bus route in the normal course of operation, the operator has the capability of announcing upcoming bus stops or other announcements to passengers currently on the bus. The operator, on approach of a designated bus stop, will actuate the foot actuated record switch 5 located at his/her feet and begin pre-recording the announcement. Upon actuation of the record switch 5, the fan-blower relay switch 16 will disengage the fan-blower 21 and the record mode indicator LED 8 will illuminate green to notify the operator that the system 1 is now recording the message. The upcoming bus stop will be recorded to the second digital memory chip 13 in control circuit 6. At this point, the operator is able to pre-record the upcoming bus stop announcement while seated in his/her normal driving position, speaking in a normal tone of voice and while continuing to drive the vehicle in a safe manner. Upon conclusion of recording the announcement, the operator will then take his/her foot off the foot actuated record switch 5 and thereby complete the recording process. Once the foot actuated record switch 5 is released, the recording will subsequently be broadcast through the bus internal speaker broadcast system 7. If a radio message is received by the two-way radio handset 17 during the playback of the bus stop announcement, the bypass switch 18 will then trip to the radio setting and the radio message will then be broadcast through the internal speaker system broadcast 7, as well as, the radio 17 speaker system.

The operator of the bus may wish to disable the automatic playback of the bus route announcement upon opening of the bus door. This is accomplished by actuating mute switch 22 on microphone apparatus 2. Once the mute switch 22 is actuated, LED 8 will flash red at 15 second intervals to remind the operator that the external speaker system 14 and bus route announcement is disabled. A subsequent actuation of mute switch 22 will enable the external speaker system 14 back to normal PA conditions and enable the automatic playback of the bus route announcement.

The system 1 also enables the operator of the bus to make "hands free" radio communications with dispatch headquarters. Upon actuation of radio switch 24, both the internal 7 and external 14 speaker broadcast systems of the bus PA system 26 are disabled to thereby allow the operator to communicate via the "hands free" microphone 3 to vehicle dispatch headquarters. While radio switch 24 is activated, any messages received from dispatch headquarters are transmitted through the radio's 17 speaker system. Upon subsequent actuation of radio switch 24, the bus PA and the digital vehicle microphone system 1 will then be returned to normal PA operation mode.

It will be understood that various modifications can be made to the various embodiments of the present disclosure herein disclosed without departing from the spirit and scope thereof. For example, the system 1 may be mounted in a variety of locations that does not interfere with the operator's ability to safely operate the vehicle. Also, various modifications may be made in the configuration of the parts. For example, the number of memory storage devices or digital recording chips used and the length of recording time attributable to each of the devices or chips may be varied. Also, the microphone according to the present disclosure may be mounted outside or independent of casing 9 in any location conducive to audio response of the driver's voice. Therefore the above description should not be construed as limiting the present disclosure but merely as exemplifications of preferred embodiments thereof. Those skilled in the art will envision other modifications within the scope and spirit of the present disclosure as defined by the claims appended hereto.

What is claimed is:

1. A vehicle public address system to be used on a bus, the system comprising:

a speaker broadcast system for broadcasting announcements, the broadcast system having at least one internal speaker for broadcasting an upcoming bus stop announcement and at least one external speaker for broadcasting a bus route information announcement;

a hands-free microphone apparatus for digitally pre-recording at least two separate announcements, the apparatus having a microphone, a hand actuated record switch for recording the bus route information announcement, a foot actuated record switch for recording the upcoming bus stop announcement, a mute switch for disabling at least one of the broadcasts of the announcements, a radio mode switch for radio communication and a record indicator;

a digital means for storing the at least two announcements and a delayed playback circuit for delayed playback of the at least two announcements through the speaker broadcast system;

an open door trigger relay which initiates the playback of the bus route information announcement through the at least one external speaker upon opening of the bus door;

a fan blower relay for temporarily disengaging the bus fan blower during the pre-recording of the upcoming bus stop announcement; and a two-way radio for receiving and transmitting radio messages.

2. A method of operating a vehicle public address system comprising the steps of:

recording a route information announcement prior to commencing a route of a vehicle, the recording including actuation of a first record switch, wherein the route information announcement is automatically broadcast upon opening of a passenger door of the vehicle; and pre-recording an upcoming stop announcement of the vehicle, the pre-recording including actuation of a second record switch, wherein the upcoming stop announcement is automatically broadcast upon conclusion of the pre-recording.

3. The method of operating a vehicle public address system according to claim 2, wherein the step of pre-recording the upcoming stop announcement is pre-recorded prior to the vehicle's arrival at a vehicle stop.

* * * * *